United States Patent [19]
Saito

[11] Patent Number: 6,081,548
[45] Date of Patent: Jun. 27, 2000

[54] SPREAD SPECTRUM RADIO COMMUNICATION APPARATUS

[75] Inventor: Naritoshi Saito, Tokyo, Japan

[73] Assignee: Kabushiki Kaisha Toshiba, Kawasaki, Japan

[21] Appl. No.: 09/311,064

[22] Filed: May 13, 1999

[30]     Foreign Application Priority Data

May 15, 1998   [JP]   Japan ................................ 10-133318

[51] Int. Cl.⁷ ...................................................... H04B 1/69
[52] U.S. Cl. ............................................................ 375/130
[58] Field of Search ................................. 375/130, 140, 375/141

[56]              References Cited
              U.S. PATENT DOCUMENTS

5,005,169   4/1991   Bronder et al. ...................... 375/130

*Primary Examiner*—Temesghen Ghebretinsae
*Attorney, Agent, or Firm*—Banner & Witcoff, Ltd.

[57]              ABSTRACT

There is provided a radio communication apparatus which is capable of both improving communication quality and reducing power consumption. An integrating clock generated by a clock generating section is supplied to each of integration damp filters contained in each data demodulator. Synchronizing with the integrating clock, each integration damp filter samples a despread receiving signal to integrate values of levels in each sampling timing for one symbol period. Based on an integrating method selecting signal supplied from a main control section, the clock generating section generates the integrating clock having the same frequency with a spread code rate (chip rate) or the integrating clock having the frequency of eight times of the spread code rate (chip rate).

9 Claims, 9 Drawing Sheets

| CHANNEL IN USE | INTEGRATING METHOD SELECTING SIGNAL |
|---|---|
| PAGING CHANNEL | L |
| TRAFFIC CHANNEL | H |

FIG. 5

| INTEGRATING METHOD SELECTING SIGNAL | INTEGRATING METHOD IN USE |
|---|---|
| L | INTEGRATE EIGHT SAMPLES/ONE CHIP |
| H | INTEGRATE ONE SAMPLE/ONE CHIP |

SPREAD SPECTRUM RADIO COMMUNICATION APPARATUS

BACKGROUND OF THE INVENTION

1. Field of the Invention

The present invention relates to a radio communication apparatus for use in vehicular and portable telephone systems, a cordless telephone system and an radio LAN system for example and more particularly to a spread spectrum radio communication apparatus which enables a CDMA (Code Division Multiple Access) communication by using a spread spectrum communication method.

2. Description of the Related Art

A spread spectrum communication method which is tolerant to interference and disturbance has been drawing attention lately as one of communication methods for use in a mobile communication system. In the radio communication system using the spread spectrum communication method, digitized audio and image data are transformed into wide band baseband signals by multiplying a spread code at first in a transmission side apparatus for example. A pseudo random noise code (PN code) and a Gold code are used as the spread code. Then, a radio carrier is digitally modulated by the transformed transmission baseband signal and the modulated wave signal is transmitted from an antenna after filtering by a band-pass filter. A BPSK or a QPSK method is used for example as the digital modulating method.

Meanwhile, the receiving side apparatus implements despreading by using the same code with the spread code used in the transmitting side apparatus and then integrates its output per one symbol length of the received data by integration damp filters. It then recovers the received data by determining the output of the integration by a determining section.

By the way, the following two types of methods are conceivable as the method for integrating the symbol of the digital received signal after the despread by the integration damp filters.

One of the methods is to sample and sum divisional position data within the data at the rate of once per one chip of the spread code. For instance, when the symbol rate of the received signal is 19.2 Kbps and the chip rate of the spread code is 1.23 Mbps, 64 data divisional positions are summed across one symbol length.

The other one is to sum received data sampled with a sampling frequency of four to eight times of the chip rate per one chip of the spread code across one symbol length. For instance, when the symbol rate of the received signal is 19.2 Kbps and the chip rate of the spread code is 1.23 Mbps similarly to those described above and when the received data sampling rate is eight times of the chip rate, i.e., 9.84 Mbps, the sample data of 64×8=512 of the received signal are summed across one symbol length.

While there are two methods of the method of integrating multi-samples/one chip and the method of integrating one sample/one chip as the method of the integration damp filter as described above, the method of integrating multi-samples/one chip outperforms the method of integrating one sample/one chip.

Figure 11:
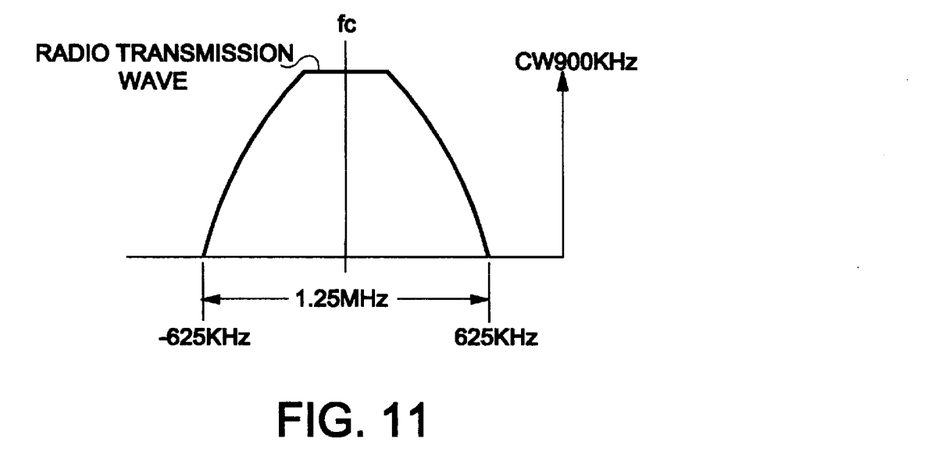
FIG. 11 is a diagram of a spectrum of a radio transmission wave and a tone interference wave.
Figure 12:
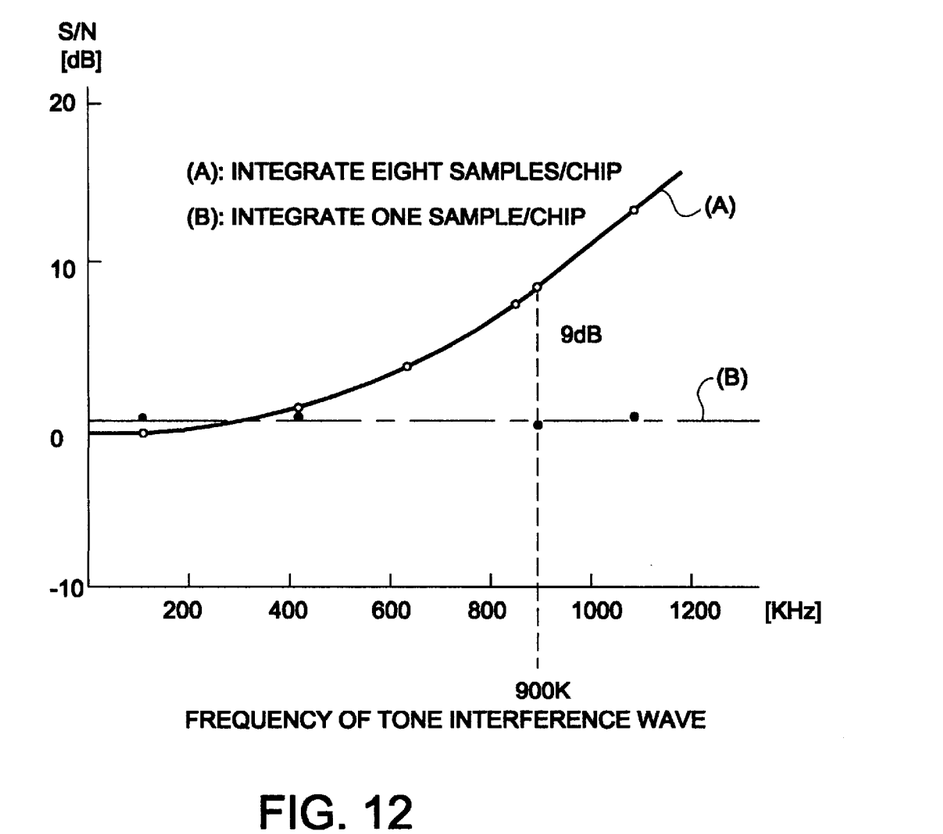
FIG. 12 is a graph showing S/N characteristics of the method of integrating eight samples/one chip and the method of integrating one sample/one chip, respectively.

That is, the receiving quality is liable to drop by being influenced by a tone interference wave when a cutoff characteristic of a receiving filter provided in a radio section is not good in the method of integrating one sample/one chip. For instance, when a tone interference wave of 900 KHz is added to a radio frequency signal having a band width of 1.25 MHz as shown in FIG. 11 and when no receiving filter for removing the tone interference wave is provided in the radio section, the relationship of receiving S/N with respect to the tone frequency turns out as shown in FIG. 12. As it is apparent from this characteristic, the receiving S/N of one using the integration damp filter of the method of integrating eight samples/one chip is higher by about 9 dB as compared to one using the filter of the method of integrating one sample/one chip.

It is noted that the examples shown in FIGS. 11 and 12 are the results when there is no receiving filter for removing tone interference waves in the radio section and when a sharp filter for removing the tone is put in the radio section, the difference of the performances between the method of integrating eight samples/one chip and the method of integrating one sample/one chip becomes small.

While the method of integrating multi-samples/one chip outperforms the method of integrating one sample/one chip as described above, it consumes electric power of several times (about eight times in case of the method of integrating eight samples/one chip) of that of the method of integrating one sample/one chip when those two methods are compared from the aspect of power consumption because the method of integrating multi-samples/one chip needs to process by using a clock which is faster than a clock used in the method of integrating one sample/one chip by several times (eight times in case of the method of integrating eight samples/one chip).

On the other hand, when the method of integrating eight samples/one chip is used, there has been a possibility that noise components are mixed into the integrated data obtained by the integration damp filter due to a shift of the clock in tracking the clock.

The noise generated due to the shift of the clock will be explained by using FIG. 13.

Figure 13A:
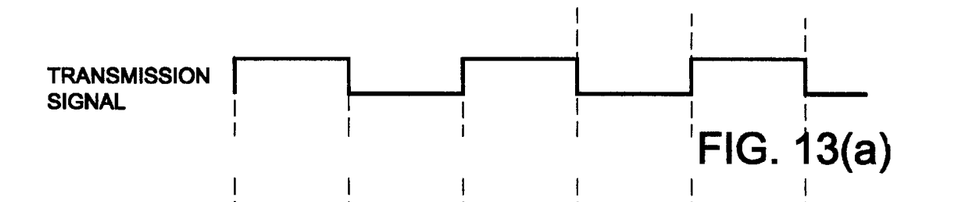
FIG. 13 is a chart for explaining noises generated in shifting clocks.
Figure 13B:
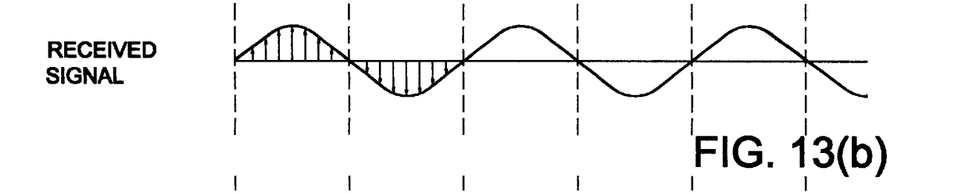
Figure 13C:
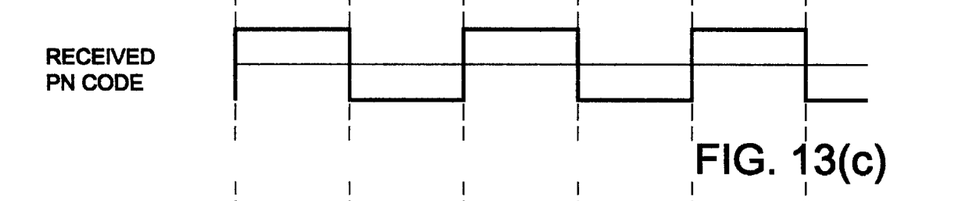
Figure 13D:
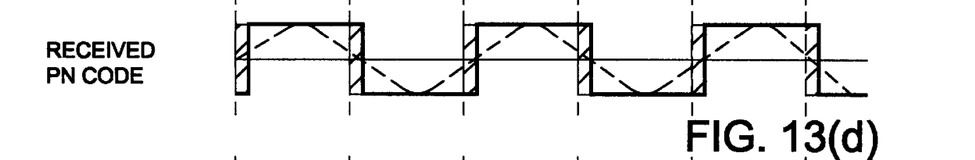
Figure 13E:
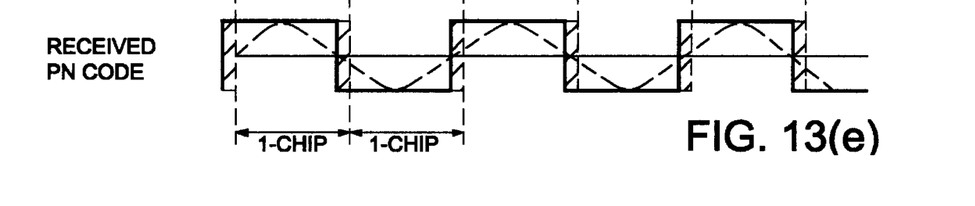

FIG. 13a shows a transmitted signal and its received signal turns out as shown in FIG. 13b due to the filtering. FIG. 13c shows a PN code to be multiplied with the received signal. It turns out as such with respect to the received signal when there is no shift of the clock. However, actually there is a case that the shift occurs between the received data and the received PN code as shown in FIGS. 13d and 13e due to the shift of the clock in tracking the clock. In the worst case, a PN code "−1" is multiplied with received data of "1" or a PN code "1" is multiplied with received data of "−1" during the period of the shift, thus causing noise components at the both ends of one-chip period.

Then, positions in the vicinity of the both ends of one-chip period are also sampled in case of the method of integrating eight samples/one chip, so that the positions of the noise components generated as described above may be sampled. In such a case, the noise components end up being mixed into the result of the integration.

While there are the two methods of the method of integrating multi-samples/one chip and the method of integrating one sample/one chip as the methods of the integration damp filter as described above, an LSI for a spectrum device including an integration damp filter processing section is made in accordance to either one of the methods in advance.

Therefore, it is difficult to realize a portable apparatus which consumes less power when the LSI in which the method of integrating multi-samples/one chip has been applied to improve the communication quality is used because power consumption in the LSI is large.

It is also difficult to realize a portable apparatus whose communication quality is high when the LSI in which the method of integrating one sample/one chip has been applied to reduce the power consumption because it is weak to the tone interference.

The method of integrating multi-samples/one chip also has had the problem that it cannot exhibit its better performance because the noise components caused by the shift between the received signal and the spread code mix into the result of the integration.

SUMMARY OF THE INVENTION

In view of the circumstances described above, a primary object of the present invention is to provide a spread spectrum radio communication apparatus which is capable of both improving the communication quality and reducing the power consumption.

A secondary object of the invention is to provide a spread spectrum radio communication apparatus which is capable of improving the communication quality further by fully exhibiting the performance of a method of integrating multi-samples/one chip when the method of integrating multi-samples/one chip is used.

In order to achieve the primary object, according to one aspect of the invention, in a spread spectrum radio communication apparatus for receiving a radio signal whose spectrum has been spread to obtain information data from the received radio signal comprising a frequency converting means for converting the received signal into a signal having a baseband bandwidth, despread spectrum means for despreading the signal having the baseband bandwidth by using a predetermined pseudo random noise code (PN code), a plurality of integration damp filters for integrating a level of the despread signal at predetermined timing for one symbol period, timing signal generating means for generating a timing signal, which supplies the predetermined timing to the integration damp filters, frequency selecting instruction means for supplying the timing signal generating means with a frequency selecting instruction in order to change the frequency of the timing signal, combining means for combining outputs of the integration damp filters, and level detecting means for obtaining the information data by comparing a level of the output of the combining means with a predetermined level.

The provision of such means allows the sampling frequency for determining the signal levels for integrating by the integration damp filter to be changed by changing the frequency of the timing signal. Accordingly, it is possible to reduce power consumption in the integrating process by specifying the lower frequency by the frequency selecting instruction or to implement a high precision integrating process by specifying the higher frequency.

According to another aspect of the invention for achieving the first object, the spread spectrum radio communication apparatus, wherein the frequency selection instruction means for supplying a first selecting instruction indicates a first predetermined frequency when a receiving channel is a paging channel and for supplying a second selecting instruction indicates a second predetermined frequency that is higher than the first predetermined frequency when the channel is a traffic channel.

The provision of such means allows a large number of signal levels determined in a short sampling frequency to be integrated in receiving the speaking channel and a higher receiving quality to be realized. It also allows the power consumption to be reduced by prolonging the sampling frequency in receiving the waiting channel.

In order to achieve the secondary object, according to a still other aspect of the invention, in a spread spectrum radio communication apparatus for receiving a radio signal whose spectrum has been spread to obtain information data from the received radio signal comprising a frequency converting means for converting the received signal into a signal having a baseband bandwidth, weighting means for supplying a pseudo random noise code (PN code) whose level is weighted by a predetermined weighting characteristic, despread spectrum means for inversely spreading the signal having the baseband bandwidth by using the weighted PN code, a plurality of integration damp filters for integrating a level of the despread signal at predetermined timing for one symbol period, timing signal generating means for generating a timing signal, which supplies the predetermined timing to the integration damp filters, combining means for combining outputs of the integration damp filters and level detecting means for obtaining the information data by comparing a level of the output of the combining means with a predetermined level.

The provision of such means allows components which generate noises in despreading the spectrum to be reduced from the spread code by the weighting process and noises caused in the signal after the despread to be reduced even if the phase of the spread code deviates with respect to the received signal by adequately setting the weighting characteristics.

According to a different aspect of the invention for achieving the secondary object described above, in a spread spectrum radio communication apparatus for receiving a radio signal whose spectrum has been spread to obtain information data from the received radio signal comprising a frequency converting means for converting the received signal into a signal having a baseband bandwidth, weighting means for supplying a signal which is obtained by weighting the signal whose frequency has been converted corresponding to a predetermined weighting characteristic, despread spectrum means for despreading the signal having the baseband bandwidth by using a predetermined pseudo random noise code (PN code), a plurality of integration damp filters for integrating a level of the despread signal at predetermined timing for one symbol period, timing signal generating means for generating a timing signal, which supplies the predetermined timing to the integration damp filters, combining means for combining outputs of the integration damp filters and level detecting means for obtaining the information data by comparing a level of the output of the combining means with a predetermined level.

The provision of such means also allows components which generate noises in despreading the spectrum to be reduced from the spread code by the weighting process and noises caused in the signal after the despread to be reduced even if the phase of the spread code deviates with respect to the received signal by adequately setting the weighting characteristics.

The specific nature of the invention, as well as other objects, uses and advantages thereof, will clearly appear from the following description and from the accompanying drawings in which like numerals refer to like parts.

DESCRIPTION OF THE PREFERRED EMBODIMENT

One embodiment of the invention will be explained below with reference to the drawings.

Figure 1:
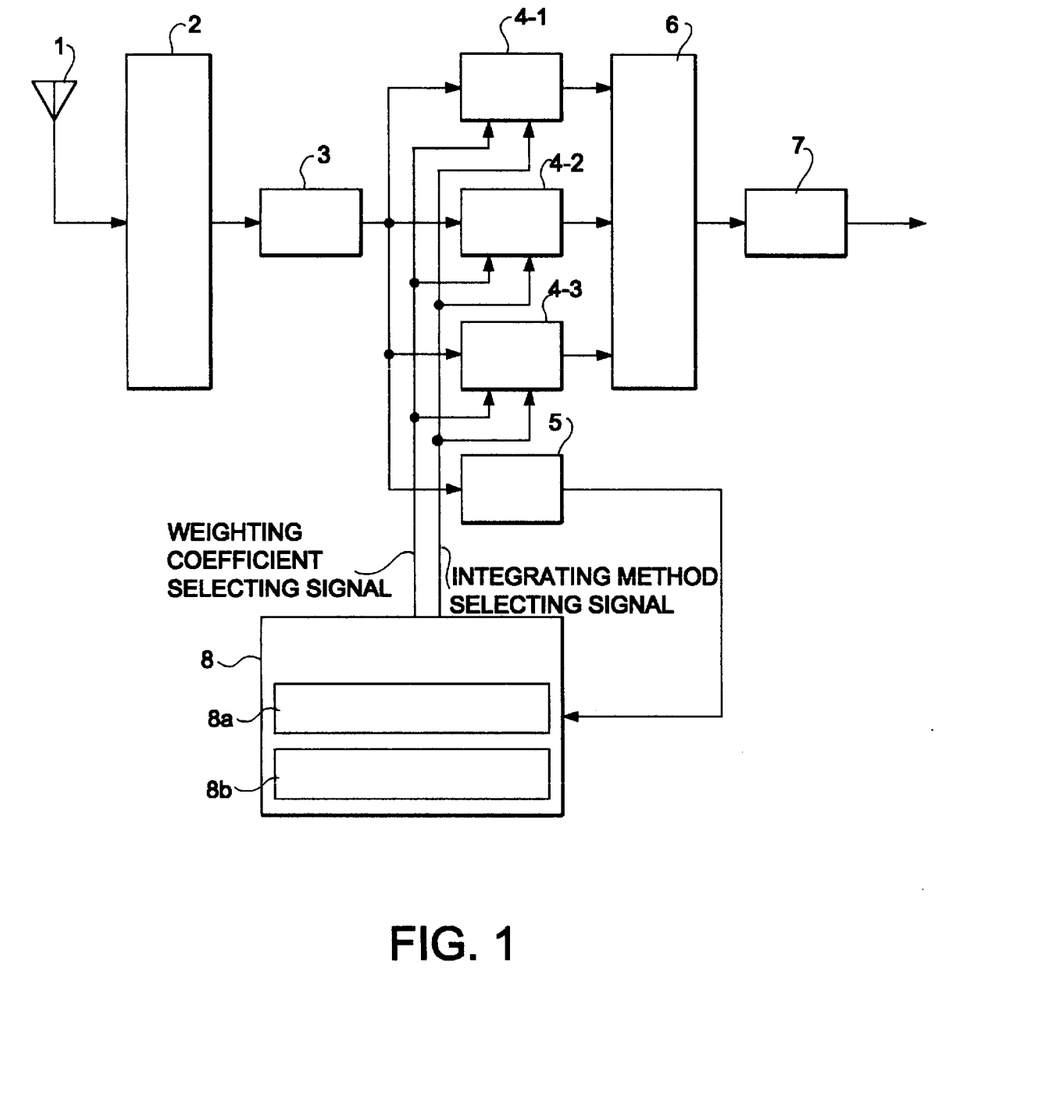
FIG. 1 is a block diagram showing the structure of a receiving system of a spread spectrum radio communication apparatus according to one embodiment of the invention.

FIG. 1 is a block diagram showing the structure of a receiving system of a spread spectrum radio communication apparatus according to one embodiment of the invention.

In the figure, a radio signal received through an antenna 1 is sampled at a predetermined sampling rate by an analog/digital (A/D) converter 3 after being amplified at low noise by an analog front end 2 and being frequency-converted into a baseband band. The sampling rate at this time is set at eight times of a chip rate of a PN code for example. The received signal sampled by the A/D converter 3 is inputted to three data demodulators 4-1, 4-2 and 4-3 and a search receiver 5 called a finger circuit, respectively.

The data demodulators 4 (4-1, 4-2 and 4-3) decode the data transmitted from a base station by despreading the spectrum corresponding to PN synchronizing information captured by the search receiver 5. Each symbol data decoded by the data demodulators 4 are inputted to a symbol combinor 6 together with the synchronization information. The symbol combinor 6 reproduces data components by combinor integrated outputs of the received signals outputted respectively from the data demodulators 4 and supplies the reproduced data components to a data determining section 7. The data determining section 7 reproduces the received data by determining levels of the reproduced data components.

It is noted that the three data demodulators 4 are provided to receive multi-passes at a high SN ratio by using a pass-diversity effect and to switch the base station connected without disconnecting the radio channel during the communication, i.e., to implement so-called "soft hand-off".

The search receiver 5 implements PN search to a pilot signal sent always from the base station and basically has the same structure with the data demodulators 4. Electric power information obtained by the PN search of the search receiver 5 is supplied to a main control section 8 to be used to retrieve position where the electric power is large.

The main control section 8 has a microprocessor as a main control circuit for example and collectively controls each section of the spread spectrum radio communication apparatus to realize operations as the spread spectrum radio communication apparatus. In addition to means for allocating a PN code of a pass to be followed by the data demodulators 4 and for implementing known processes such as a process for arranging the pass-diversity based on the result of the retrieval of position by using the electric power information supplied from the search receiver 5, the main control section 8 has an integrating method selection instruction means 8a and a weighting coefficient selection instruction means 8b.

Here, the integrating method selection instruction means 8a selects an integrating method in an integration damp filter (described later) contained in the respective data demodulators 4 from the method of integrating eight samples/one chip and the method of integrating one sample/one chip and supplies an integrating method selecting signal for specifying to process by the integrating method to the respective data demodulators 4. The weighting coefficient selection instruction means 8b selects a weighting coefficient to be used in a weighting processing section (described later) contained in the respective data demodulator 4 out of a plurality of candidates and supplies a weighting coefficient selecting signal for specifying a weighting process using the weighting coefficient to the respective data demodulator 4.

It is noted that although the main control section 8 gives and takes a large number of control signals among the respective sections to control the respective sections, only the integrating method selecting signal and the weighting coefficient selecting signal are shown in FIG. 1.

The data demodulators 4 generate own clock by using the sampling clock of the A/D converter 3 as the reference clock and operate independently from each other by the own clock. It is constructed as described below.

Figure 2:
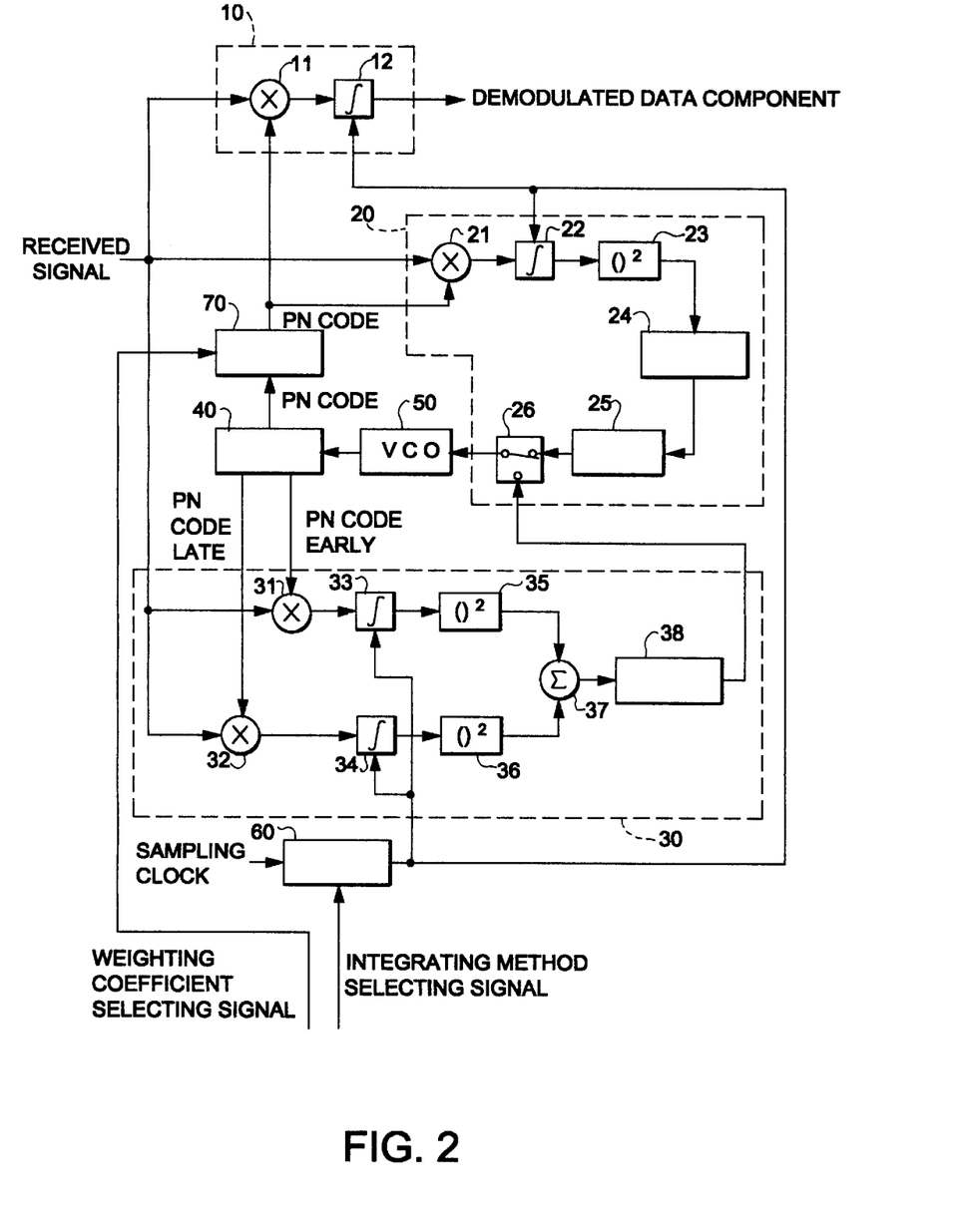
FIG. 2 is a circuit block diagram showing the structure of a data demodulator.

FIG. 2 is a circuit block diagram showing the structure of the data demodulator. That is, each data demodulator 4 comprises a data decoding section 10, an initial capturing section 20, a clock tracking section 30, a PN code generator 40, a voltage controlled oscillator (VCO) 50, a clock generating section 60 and a weighting processing section 70.

Among them, the initial capturing section 20 performs an initial capturing operation in synchronizing with the PN code by sliding correlation for example. It shifts the PN code generating phase per ¼ to one chip every time when it finds an integrated value of a predetermined symbol of the received signal and shifts the initial capturing section to the clock tracking section 30 at the point of time when a receiving power level of a predetermined level or more is observed.

That is, the received signal is despread by being multiplied with the PN code which has been generated from the PN code generator 40 and to which a weighting process described later has been implemented by the weighting processing section 70 in a multiplier 21. Then, its output signal is integrated by an integration damp filter 22 by the predetermined symbol. Its integrated value, i.e., the correlational output of the received signal and the PN code, is transformed into a value of electrical power by being squared by a squarer 23 and is inputted to a threshold comparing section 24 to compare with a threshold value therein. A mode setting section 25 sets an initial capturing mode and sets a change-over switch 26 to the side of the initial capturing section 20 during a period until when the threshold comparing section 24 detects the received electrical power which is greater than the threshold value. When the comparing section 24 detects a value of the electrical power greater than the threshold value, it shifts the mode from the initial capturing mode to the clock tracking mode and switches the change-over switch 26 to the side of the clock tracking section 30.

The clock tracking section 30 performs the clock tracking operation as follows by using a PN code Early and a PN code Late generated from the PN code generator 40 beside the PN code for the data decoding section 10.

Figure 3:
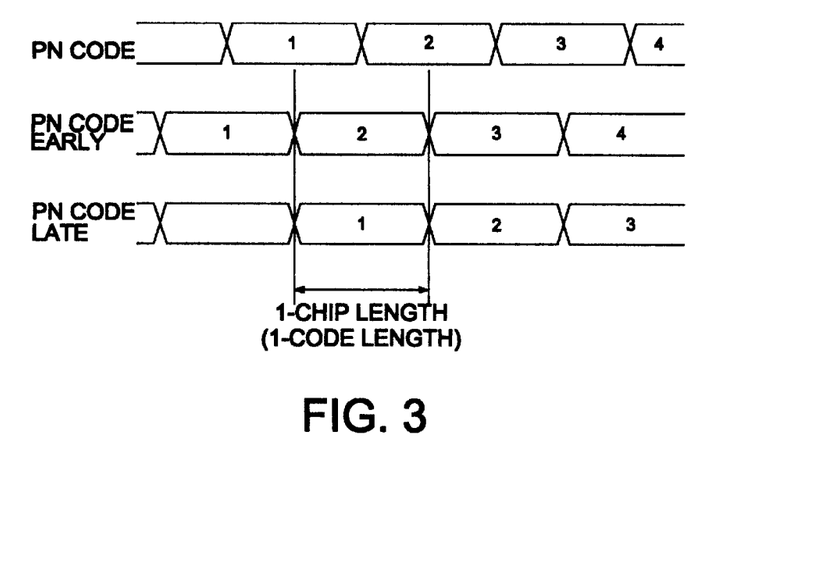
FIG. 3 is a chart showing the relationship of phases of a PN code, a PN code Early and a PN code Late.
Figures 4A, 4B, 4C, 4D:
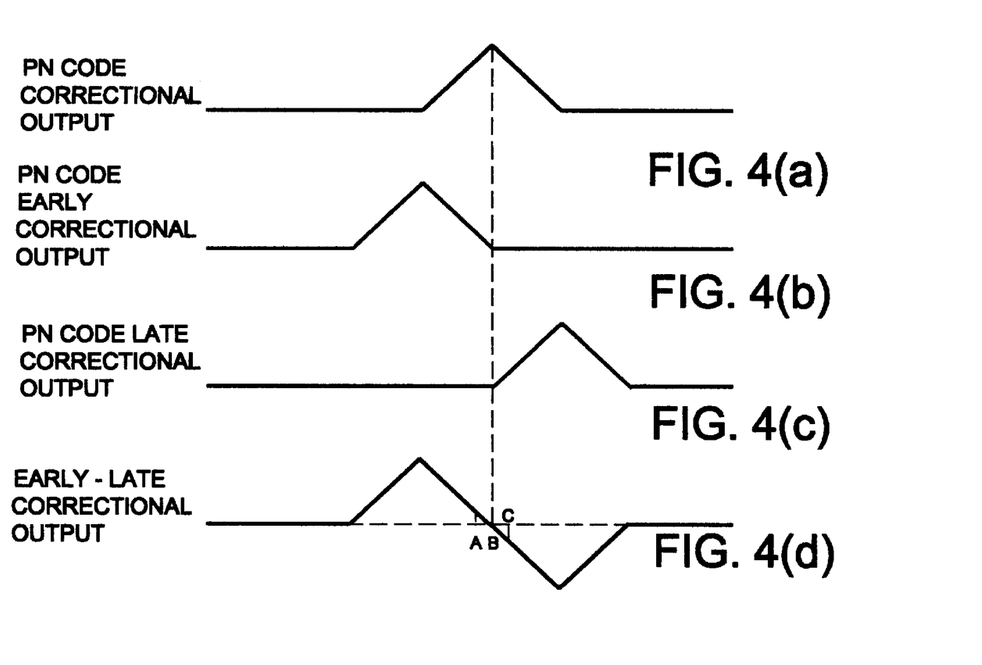
FIG. 4 is a chart showing one example of signal waves obtained in an initial capturing section and a clock tracking section.

That is, it outputs the PN code Early whose phase is advanced by a ½ chip and the PN code Late whose phase is retarded by a ½ chip with respect to the PN code supplied from the PN code generator 40 to the initial capturing section 20 and the data decoding section 10. FIG. 3 is a chart showing the relationship of the phases of those PN codes. Multipliers 31 and 32 despread the received signal by multiplying with the PN code Early and the PN code Late and integration damp filters 32 and 34 integrate their output signals by the predetermined symbol, respectively. Then, squarers 35 and 36 square the respective integrated values to convert into the values of electrical power and an adder 37 adds them while keeping Early one as it is and setting the Late one at a minus value. The added signal is smoothed by a loop filter 38 and is then supplied to the voltage controlled oscillator (VCO) 50 via the change-over switch 26. FIG. 4 is a chart showing one example of signal waves obtained in the initial capturing section 20 and the clock tracking section 30, wherein FIG. 4a shows a value of electrical power of the PN code correlational output outputted from the initial capturing section 20 and the data decoding section 10 when the phase of the PN code generated from the PN code generator 40 coincides with the phase of the PN code of the received signal. FIGS. 4b and 4c show values of electrical power of the PN code correlational outputs outputted from the squarers 35 and 36 of the clock tracking section 30 when the phases of the PN code Early and PN code Late coincide respectively with the phase of the PN code of the received signal and FIG. 4d shows a value of electrical power of the correlational output outputted from the adder 37 of the clock tracking section 30.

Accordingly, when the value of electrical power of the correlational output outputted from the adder 37 of the clock tracking section 30 is now located at position A in FIG. 4d for example, the loop filter 38 smoothes the output and the clock tracking section 30 supplies a instruction signal for retarding the clock phase to the VCO 50. Therefore, the phase of the PN code generated from the PN code generator 40 changes in the retarding direction and thereby, the correlational output level of the adder 37 moves from the position A to position B. When the value of electrical power of the correlational output of the adder 37 is located at position C in FIG. 4d on the other hand, the clock tracking section 30 supplies a instruction signal to the VCO 50 for advancing the clock phase. Accordingly, the phase of the PN code generated from the PN code generator 40 changes in the advancing direction and thereby, the correlational output level of the adder 37 moves from the position C to the position B.

The position B is the position where the output of the decoded data component outputted from the integration damp filter 12 of the data decoding section 10 is maximum as it is apparent from FIG. 4a and the clock tracking section 30 controls the phase of the PN code generated by the PN code generator 40 via the VCO 50 so that the correlational output level of the adder 37 comes near the position B.

The data decoding section 10 comprises a multiplier 11 and the integration damp filter 12. The data decoding section 10 obtains the decoded data component by despreading the received signal by multiplying the PN codes which is generated by the PN code generator 40 in synchronism with the PN code in the received signal by the operations of the initial capturing section 20 and the clock tracking section 30 as described above and to which the weighting process described later is implemented by the weighting processing section 70 by the multiplier 11 and by integrating the output signal by the integration damp filter 12 per every one symbol.

While all of the integration damp filter 12 in the data decoding section 10, the integration damp filter 22 in the initial capturing section 20 and the integration damp filters 33 and 34 in the clock tracking section 30 integrate input signals per every one symbol or per every predetermined symbols, the values to be integrated are input levels in the timing synchronized with an integrating clock generated by the clock generating section 60.

The clock generating section 60 generates the integrating clock used in the integration damp filters 12, 22, 33 and 34 from the sampling clock of the A/D converter 3. The clock generating section 60 changes the frequency of the integrating clock to be generated according to the method of integrating eight samples/one chip or the method of integrating one sample/one chip specified by the integrating method selecting signal supplied from the main control section 8.

While the weighting processing section 70 supplies the PN code generated by the PN code generator 40 to the data decoding section 10 and the initial capturing section 20 after implementing the weighting process, a weighting coefficient used for this weighting process is what specified by a weighting coefficient selecting signal supplied from the main control section 8.

The operation of the spread spectrum radio communication apparatus constructed as described above will be explained next.

It is noted that an explanation of the basic operation for receiving data of the spread spectrum radio communication apparatus of the present embodiment will be omitted here because it is almost the same with the prior art one and operations related to the integrating process of the respective integration damp filters 12, 22, 33 and 34 will be explained in detail here.

When a symbol rate of the received signal is 19.2 Kbps and a spread code rate (chip rate) is 1.23 Mbps for example, there exist 64 chips per one symbol rate and each of the integration damp filters 12, 22, 33 and 34 integrates values of levels of those 64 chips. While this is the same with the prior art one, a number of samples per one chip changes corresponding to the frequency of the integrating clock in the present embodiment.

Figure 5:
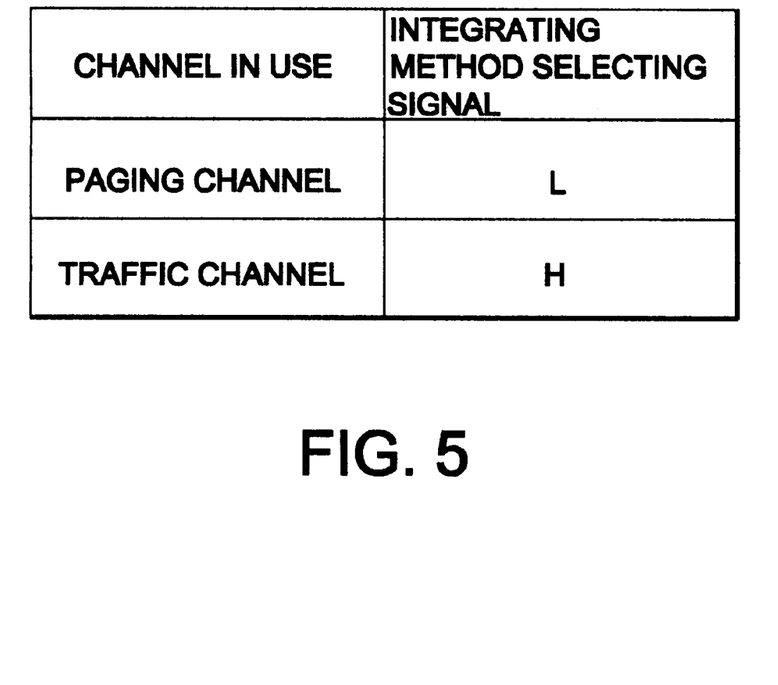
FIG. 5 is a table showing the relationship between channels in use and states of integrating method selecting signals.

By the way, the main control section 8 monitors whether a channel from which data is to be decoded by the data demodulators 4, i.e., the channel in use, is a waiting channel or a speaking channel by the integrating method selection instruction means 8a. Then, the main control section 8 sets the integrating method selecting signal at "L" level when the channel in use is the waiting channel and at "H" level when the channel in use is the speaking channel as shown in FIG. 5.

The integrating method selecting signal generated by the main control section 8 as described above is supplied to a CKSL pin of a spread spectrum digital processing LSI containing each or all of the data decoding sections 4-1, 4-2 and 4-3. Then, because the CKSL pin of the spread spectrum digital processing LSI is connected with the clock generating section 60 of the data demodulators 4 contained in the spread spectrum digital processing LSI, the integrating method selecting signal is supplied to the clock generating section 60 of the data demodulator 4, respectively.

Figure 6:
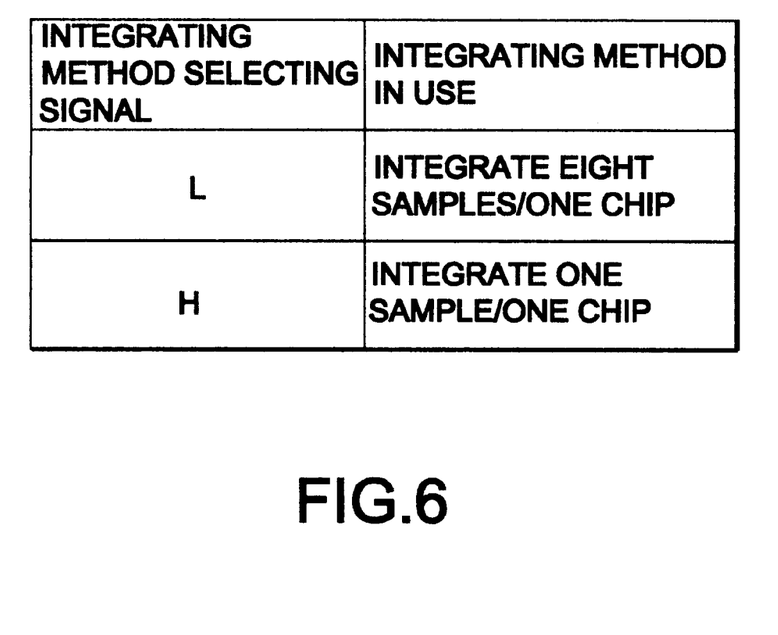
FIG. 6 is a table showing the relationship between the states of the integrating method selecting signals and integrating methods in use.

The clock generating section 60 monitors the integrating method selecting signal supplied via the CKSL pin and selects the integrating method corresponding to the level of the integrating method selecting signal as shown in FIG. 6. That is, the clock generating section 60 selects the method of integrating eight samples/one chip when the integrating method selecting signal is on the "H" level and the method of integrating one sample/one chip when the integrating method selecting signal is on the "L" level.

When the clock generating section 60 selects the method of integrating one sample/one chip, it generates an integrating clock having the same frequency with the spread code rate (chip rate) based on the sampling clock. When the clock generating section 60 selects the method of integrating eight samples/one chip, it generates an integrating clock having the frequency of eight times of the spread code rate (chip rate) based on the sampling clock. That is, when the spread code rate (chip rate) is 1.23 Mbps for example, the clock generating section 60 generates an integrating clock of 1.23 MHz when it selects the method of integrating one sample/one chip and generates an integrating clock of 9.84 MHz when it selects the method of integrating eight samples/one chip.

Figure 7A:
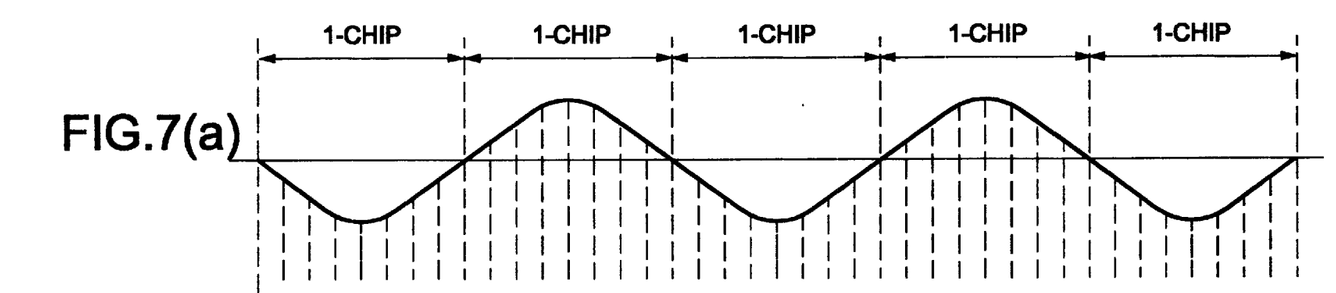
FIG. 7 is a chart showing an integrating clock when a method of integrating one sample/one chip is in use and an integrating clock when a method of integrating eight samples/one chip is in use.
Figures 7B, 7C:
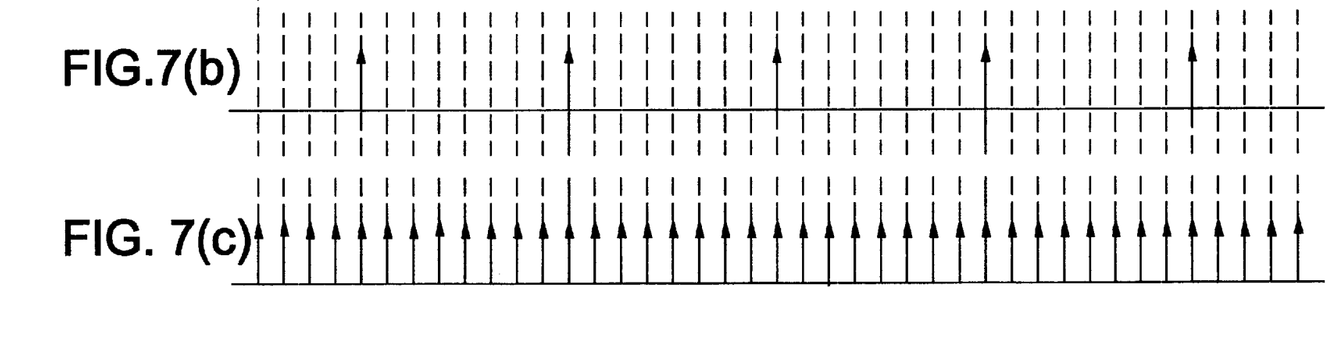

It is noted that when the clock generating section 60 selects the method of integrating one sample/one chip, it outputs the integrating clock as shown in FIG. 7b so that it is synchronized with the divisional position of each chip of the received signal shown in FIG. 7a. When the clock generating section 60 selects the method of integrating eight samples/one chip, it outputs the integrating clock as shown in FIG. 7c so that one leading edge out of eight leading edges is synchronized with the divisional position of each chip of the received signal shown in FIG. 7a.

Then, each of the integration damp filters 12, 22, 33 and 34 samples the received signal despread by the timing synchronized with the integrating clock generated as described above and integrates the sampled values across one symbol period.

Figure 8A:
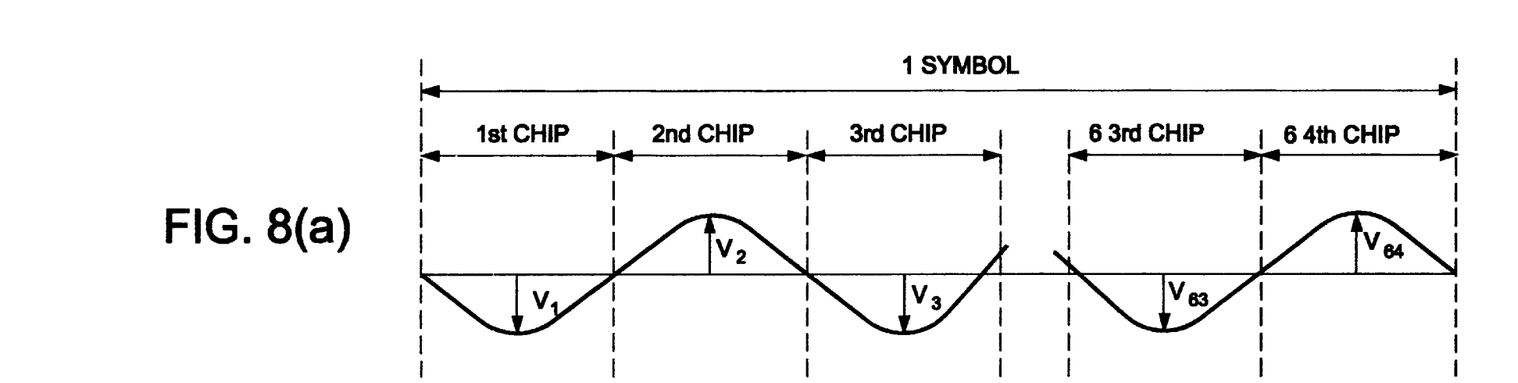
FIG. 8 is a chart showing states of existence of values to be integrated through an integrating process.

Thus, when the channel being received is the waiting channel and the integrating clock is what is shown in FIG. 7b, each of the integration damp filters 12, 22, 33 and 34 samples the divisional position of each chip and integrates values of the levels. When the symbol rate of the received signal is 19.2 Kbps and the spread code rate (chip rate) is 1.23 Mbps for example, the integration damp filter integrates values of 64 levels of V1 through V64 as shown in FIG. 8a because there exit 64 chips per one symbol rate.

Figure 8B:
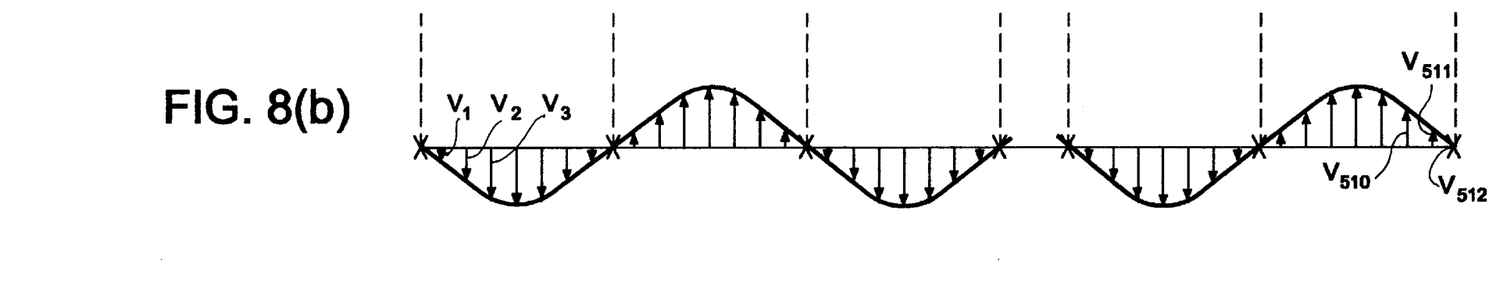

Meanwhile, when the channel being received is the speaking call and the integrating clock is what is shown in FIG. 7c, each of the integration damp filters 12, 22, 33 and 34 samples eight positions per chip and integrates values of the levels. When the symbol rate of the received signal is 19.2 Kbps and the spread code rate (chip rate) is 1.23 Mbps for example, the integration damp filter integrates values of 512 levels of V1 through V512 as shown in FIG. 8b.

Thus, according to the present embodiment, each of the integration damp filters 12, 22, 33 and 34 executes the high precision integrating process in the method of integrating eight samples/one chip while receiving the speaking channel and can keep the good receiving quality. Then, the integration damp filter executes the integrating process in the method of integrating one sample/one chip which consumes less power and can extend the duration of a battery while receiving the waiting channel which requires no such high receiving quality.

Accordingly, it becomes possible to achieve both the high receiving quality and the low power consumption.

Figure 9A:
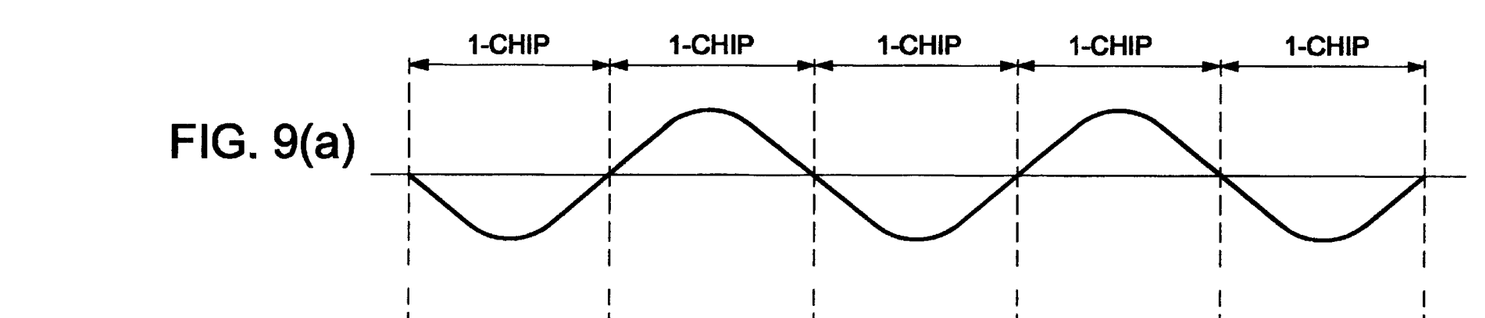
FIG. 9 is a chart showing one example of characteristics of a weighting coefficient.
Figure 9B:
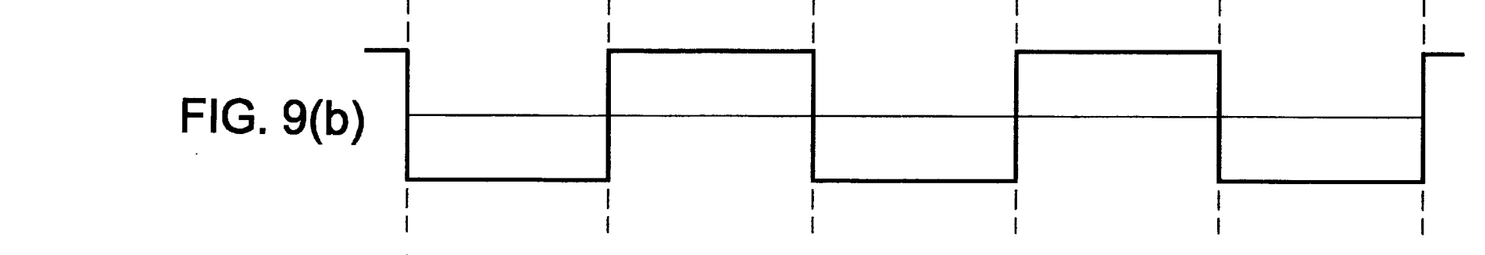
Figure 9C:
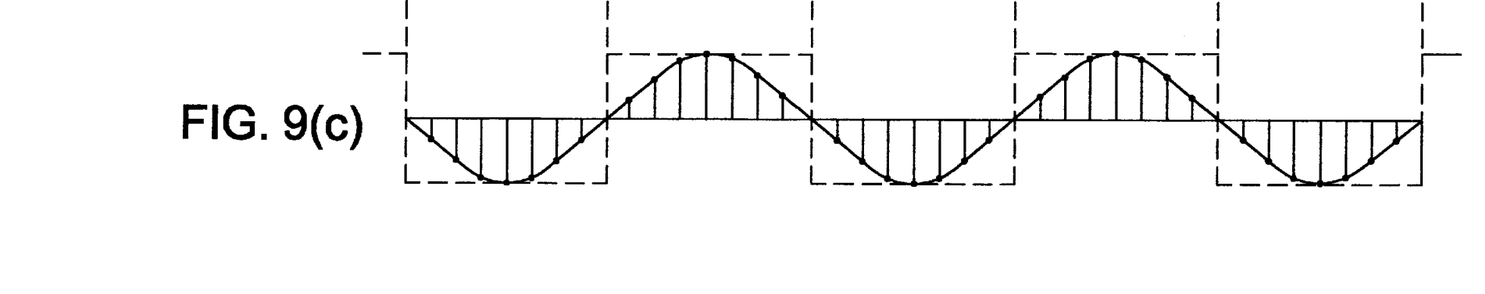

Meanwhile, the weighting processing section 70 uses a weighting coefficient having a characteristic such that it becomes largest at the divisional position in the vicinity of the center of one chip period and becomes small as it approaches to the both ends of one chip period as shown in FIG. 9a to weight the PN code outputted from the PN code generator 40 as shown in FIG. 9b and to obtain a PN code as shown in FIG. 9c. After implementing the weighting as described above, the weighting processing section 70 supplies the PN code to the data decoding section 10 and the initial capturing section 20.

As a result, even if the PN code outputted from the PN code generator 40 deviates with respect to the received data, the level of the PN code multiplied with the received signal of the different adjacent chip is small and noises caused by that effect is reduced because the level of the PN code is small at the both end portions of one chip period.

It is noted that it is also possible to eliminate the noise when the weighting coefficient of the both ends of one chip period is zeroed.

The weighting processing section 70 has a plurality of patterns of weighting coefficients and can implement the weighting process by using a weighting coefficient specified by the weighting coefficient selecting signal outputted by the main control section 8 through the weighting coefficient selection instruction means 8b. It is possible to receive by increasing S/N by effectively selecting the plurality of weighting coefficients. It is noted that it is conceivable to prepare a roll-off filter, a route roll-off filter or a vessel type filter adequately as means for preparing the plurality of weighting coefficients.

It is noted that the present invention is not limited to the embodiment described above. For instance, although the integrating method is selected corresponding to the channel in use, i.e., the waiting channel or the speaking channel, in the embodiment described above, the condition for selecting the integrating method may be arbitrary. For example, the integrating method may be selected corresponding to a setting made by a user of giving priority to the receiving quality or to the duration of the battery or corresponding to the received signal whether it is a speech or data.

Further, although all of the integration damp filters are operated in the common integrating method in the embodiment described above, it is possible to arrange so that the integrating method may be switched individually per each integration damp filter or per each group of the integration damp filters. That is, a three-bit integrating method selecting signal may be adopted so as to apply the method of integrating one sample/one chip only to the integration damp filter 12 of the data decoding section 10 when the signal is "001b" and to apply the method of integrating one sample/one chip to the integration damp filter 12 of the data decoding section 10 and the integration damp filters 33 and 34 of the clock tracking section 30 when the signal is "011b".

Still more, although the main control section 8 is not contained in the spread spectrum digital processing LSI in the embodiment described above, the integrating method selecting signal and the weighting coefficient selecting signal may be realized as internal signals of the spread spectrum digital processing LSI when the main control section 8 is contained in the spread spectrum digital processing LSI.

Figure 10:
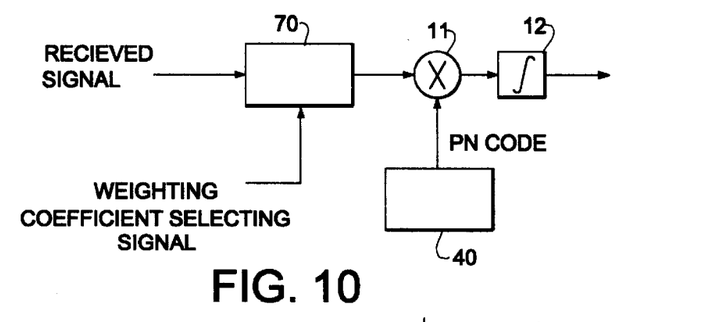
FIG. 10 shows a modified example of the structure for a weighting process.

Although the weighting processing section 70 implements the weighting process to the PN code in the embodiment described above, the same effect may be obtained even when the weighting process is implemented on the received signal as shown in FIG. 10.

Beside them, it is possible to practice various modifications within a scope of the spirit of the invention.

What is claimed is:

1. A spread spectrum radio communication apparatus for receiving a radio signal whose spectrum has been spread to obtain information data from the received radio signal comprising:

a frequency converting means for converting the received signal into a signal having a baseband bandwidth;

despread spectrum means for despreading the signal having the baseband bandwidth by using a predetermined pseudo random noise code (PN code);

a plurality of integration damp filters for integrating a level of the despread signal at predetermined timing for one symbol period;

timing signal generating means for generating a timing signal, which supplies the predetermined timing to the integration damp filters;

frequency selecting instruction means for supplying the timing signal generating means with a frequency selecting instruction in order to change the frequency of the timing signal;

combining means for combining outputs of the integration damp filters; and level detecting means for obtaining the information data by comparing a level of the output of the combining means with a predetermined level.

2. The spread spectrum radio communication apparatus of claim 1, wherein the frequency selection instruction means for supplying a first selecting instruction indicates a first predetermined frequency when a receiving channel is a paging channel and for supplying a second selecting instruction indicates a second predetermined frequency that is higher than the first predetermined frequency when the channel is a traffic channel.

3. The spread spectrum radio communication apparatus of claim 1, further comprising weighting means for supplying a pseudo random noise code (PN code) whose level is weighted by a predetermined weighting characteristic to the despread spectrum means.

4. The spread spectrum radio communication apparatus of claim 3, wherein a plurality of integration damp filters for integrating a level of the despread signal that has been despread by the weighted PN code at predetermined timing for one symbol period.

5. A spread spectrum radio communication apparatus for receiving a radio signal whose spectrum has been spread to obtain information data from the received radio signal comprising:

a frequency converting means for converting the received signal into a signal having a baseband bandwidth;

weighting means for supplying a pseudo random noise code (PN code) whose level is weighted by a predetermined weighting characteristic;

despread spectrum means for inversely spreading the signal having the baseband bandwidth by using the weighted PN code;

a plurality of integration damp filters for integrating a level of the despread signal at predetermined timing for one symbol period;

timing signal generating means for generating a timing signal, which supplies the predetermined timing to the integration damp filters;

combining means for combining outputs of the integration damp filters; and level detecting means for obtaining the information data by comparing a level of the output of the combining means with a predetermined level.

6. The spread spectrum radio communication apparatus of claim 3 or claim 5, wherein the predetermined weighting characteristic is variable periodically.

7. The spread spectrum radio communication apparatus of claim 3 or 5, wherein the weighting means having a plurality of weighting characteristics.

8. The spread spectrum radio communication apparatus of claim 7, further comprising weighting characteristics selecting instruction means supplying a instruction signal indicates which weighting characteristics should be selected for weighting the level of the PN code to the weighting means.

9. A spread spectrum radio communication apparatus for receiving a radio signal whose spectrum has been spread to obtain information data from the received radio signal comprising:

a frequency converting means for converting the received signal into a signal having a baseband bandwidth;

weighting means for supplying a signal which is obtained by weighting the signal whose frequency has been converted corresponding to a predetermined weighting characteristic;

despread spectrum means for despreading the signal having the baseband bandwidth by using a predetermined pseudo random noise code (PN code);

a plurality of integration damp filters for integrating a level of the despread signal at predetermined timing for one symbol period;

timing signal generating means for generating a timing signal, which supplies the predetermined timing to the integration damp filters;

combining means for combining outputs of the integration damp filters; and level detecting means for obtaining the information data by comparing a level of the output of the combining means with a predetermined level.

* * * * *